United States Patent
Bullard (10) Patent No.: US 10,711,832 B2
(45) Date of Patent: Jul. 14, 2020

(54) FLEXURAL PIVOT

(71) Applicant: Raytheon Company, Waltham, MA (US)

(72) Inventor: Andrew L. Bullard, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 384 days.

(21) Appl. No.: 15/448,538

(22) Filed: Mar. 2, 2017

(65) Prior Publication Data
US 2018/0252261 A1  Sep. 6, 2018

(51) Int. Cl.
*F16C 11/12* (2006.01)

(52) U.S. Cl.
CPC .......... *F16C 11/12* (2013.01); *F16C 2326/47* (2013.01); *F16C 2370/20* (2013.01)

(58) Field of Classification Search
CPC . F16C 11/12; F16D 3/56; F16D 3/005; Y10T 403/54; Y10T 74/1293; F16F 15/073
See application file for complete search history.

(56) References Cited

U.S. PATENT DOCUMENTS

| | | | |
|---|---|---|---|
| 2,931,092 A | 4/1960 | Humphrey |
| 3,142,888 A | 8/1964 | Troeger |
| 3,181,918 A | 5/1965 | Troeger |
| 3,319,951 A | 5/1967 | Seelig |
| 3,465,997 A | 9/1969 | Piske |
| 3,544,175 A | 12/1970 | Tooker |
| 3,811,665 A | 5/1974 | Seeling |
| 3,844,022 A | 10/1974 | Kutash |
| 4,261,211 A | 4/1981 | Haberland |
| 4,297,904 A | 11/1981 | Morton |
| 4,533,100 A | 8/1985 | Paseri |

(Continued)

FOREIGN PATENT DOCUMENTS

| | | |
|---|---|---|
| DE | 2344304 A1 | 3/1974 |
| DE | 2454811 A1 | 5/1976 |

(Continued)

OTHER PUBLICATIONS

Space-Definition of Space by Merriam-Webster. Dictionary Definition [online]. Merriam-Webster, 2019 [retrieved Dec. 2, 2019]. Retrieved from the Internet: <URL:www.merriam-webster.com/dictionary/space> (Year: 2019).*

(Continued)

*Primary Examiner* — Jonathan P Masinick (57) ABSTRACT

A flexural pivot is disclosed. The flexural pivot can include a plurality of flexure support members, each flexure support member having a plurality of flexure openings and a plurality of wells each in fluid communication with a respective flexure opening. The flexural pivot can also include at least one flexure to rotatably couple the plurality of flexure support members to one another. The at least one flexure can have first and second flexible blades arranged in a cross configuration. The first and second flexible blades can be disposed in the flexure openings of the flexure support members, and coupling material deposited in the flexure openings can couple the first and second flexible blades to the flexure support members.

13 Claims, 5 Drawing Sheets

(56) References Cited

U.S. PATENT DOCUMENTS

| | | | |
|---|---|---|---|
| 4,571,988 A | 2/1986 | Murphy, Jr. | |
| 4,640,640 A | 2/1987 | Herrington | |
| 4,768,702 A | 9/1988 | Takahashi et al. | |
| 4,802,784 A | 2/1989 | Brooks | |
| 5,061,107 A | 10/1991 | Brooks | |
| 5,620,169 A | 4/1997 | Payne | |
| 6,283,666 B1 | 9/2001 | Genequand | |
| 6,365,252 B1 | 4/2002 | Ortiz et al. | |
| 6,666,612 B2 * | 12/2003 | Lorigny | F16C 11/12 267/160 |
| 7,296,481 B2 | 11/2007 | Kahle et al. | |
| 7,665,371 B2 | 2/2010 | Mastinu et al. | |
| 8,556,533 B2 | 10/2013 | Bullard | |
| 2002/0084563 A1 * | 7/2002 | Lorigny | F16C 11/12 267/193 |
| 2009/0173170 A1 | 7/2009 | Mastinu et al. | |
| 2013/0129407 A1 | 5/2013 | Bullard | |

FOREIGN PATENT DOCUMENTS

| | | | |
|---|---|---|---|
| EP | 1887398 A1 | 2/2008 | |
| FR | 2446952 A1 * | 8/1980 | F16C 11/12 |
| GB | 1427170 A | 3/1976 | |
| JP | 1974-132433 A | 12/1974 | |

OTHER PUBLICATIONS

International Search Report for International Application No. PCT/US2017/065856 dated Feb. 7, 2018, 17 pages.

International Search Report for International Application No. PCT/US2017/065870 dated Feb. 8, 2018, 15 pages.

Meline, Universal beam steering mirror design using the cross blade flexure, SPIE, 1992, p. 424-442, vol. 1697.

Troeger, Considerations in the Application of Flexural Pivots, Automatic Control Data Systems Engineering, Nov. 1962, 6 pages, vol. 17 No. 4.

* cited by examiner

FLEXURAL PIVOT

BACKGROUND

Flexural pivots are devices that permit mechanical members to pivot about a common axis relative to each other through a limited angle range. Because angular motion is accomplished through flexing of elastic flexural elements, rather than contact surface displacement, flexural pivots operate without friction and thus without a need for lubrication. Flexural pivots can therefore be a substitute for bearings in applications where friction and/or the need for lubrication are concerns.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts is provided below and then specific examples are described in further detail later. This initial summary is intended to aid readers in understanding the examples more quickly, but is not intended to identify key features or essential features of the examples, nor is it intended to limit the scope of the claimed subject matter.

A variety of flexural pivots are commercially available for variety of applications. Common problems with typical commercial off-the-shelf (COTS) flexural pivots that have brazed joints are repeatable performance and reliability, particularly where high performance and durability are required for the application. This may be due to the difficulty in manufacturing flexural pivots in a commercially viable manner. Additionally, applications that require relatively large angular ranges of motion may cause stresses that exceed the strength of COTS flexural pivots, often resulting in brazed joint failures. Thus, it is desirable to develop a flexural pivot design that provides high performance, large angular travel, and reliability while being relatively simple and cost-effective to produce.

Accordingly, a flexural pivot is disclosed with brazed joints that can provide high performance, large range of motion, and reliability and that is readily able to be manufactured. The flexural pivot can include a plurality of flexure support members, each flexure support member having a plurality of flexure openings and a plurality of wells each in fluid communication with a respective flexure opening. The flexural pivot can also include at least one flexure to rotatably couple the plurality of flexure support members to one another. The at least one flexure can have first and second flexible blades arranged in a cross configuration. The first and second flexible blades can be disposed in the flexure openings of the flexure support members, and braze material or other coupling material (e.g. an epoxy or other adhesive) deposited in the flexure openings can couple the first and second flexible blades to the flexure support members.

In one aspect, a flexural pivot precursor is disclosed. The flexural pivot precursor can comprise a plurality of flexure support members, each flexure support member having a plurality of flexure openings and a plurality of wells each in fluid communication with a respective flexure opening. The flexural pivot precursor can also include at least one flexure to rotatably couple the plurality of flexure support members to one another. The at least one flexure can have first and second flexible blades arranged in a cross configuration. The first and second flexible blades can be disposed in the flexure openings of the flexure support members.

A flexural pivot manufacturing system is also disclosed. The system can comprise a fixture having a bottom support and a top support coupled to the bottom support. The system can also comprise a plurality of flexural pivot support member workpieces coupled to the fixture. The plurality of flexural pivot support member workpieces can include a first flexural pivot support member workpiece supported by and coupled to the bottom support, and a second flexural pivot support member workpiece supported by and coupled to the top support. The top and bottom supports can facilitate formation of flexure openings and wells in fluid communication with the flexure openings extending into ends of the flexural pivot support member workpieces to form flexural pivot flexure support members. The top and bottom supports can also facilitate disposing at least one flexure in the flexure openings. The at least one flexure can have first and second flexible blades arranged in a cross configuration. In addition, the top and bottom supports can facilitate disposing braze or other coupling material in the wells to couple the at least one flexure to the flexural pivot flexure support members to provide for rotational movement of the flexural pivot flexure support members relative to one another.

In addition, a method for making a flexural pivot is disclosed. The method can comprise coupling a plurality of flexural pivot support member workpieces to a fixture, wherein a first flexural pivot support member workpiece is coupled to a bottom support of the fixture, and a second flexural pivot support member workpiece is coupled to a top support of the fixture. The method can also comprise coupling the top and bottom support to one another. The method can further comprise forming flexure openings and wells in fluid communication with the flexure openings extending into ends of the flexural pivot support member workpieces to form a plurality of flexural pivot flexure support members. The method can even further comprise disposing at least one flexure in the flexure openings of the plurality of flexural pivot flexure support members, wherein the at least one flexure has first and second flexible blades arranged in a cross configuration. The method can still further comprise disposing coupling material in the wells. Additionally, the method can comprise heating the coupling material sufficient to cause the coupling material to flow into the flexure openings to couple the at least one flexure to the flexural pivot flexure support members and thereby rotatably couple the plurality of flexural pivot flexure support members to one another. With respect to the coupling of the at least one flexure to the flexural pivot flexure support members, the method can alternatively comprise disposing an epoxy or other adhesive in the wells, wherein the epoxy or other adhesive comprises a viscosity sufficient to facilitate wicking of the epoxy or other adhesive into the flexure openings via capillary action.

Figure 1A:
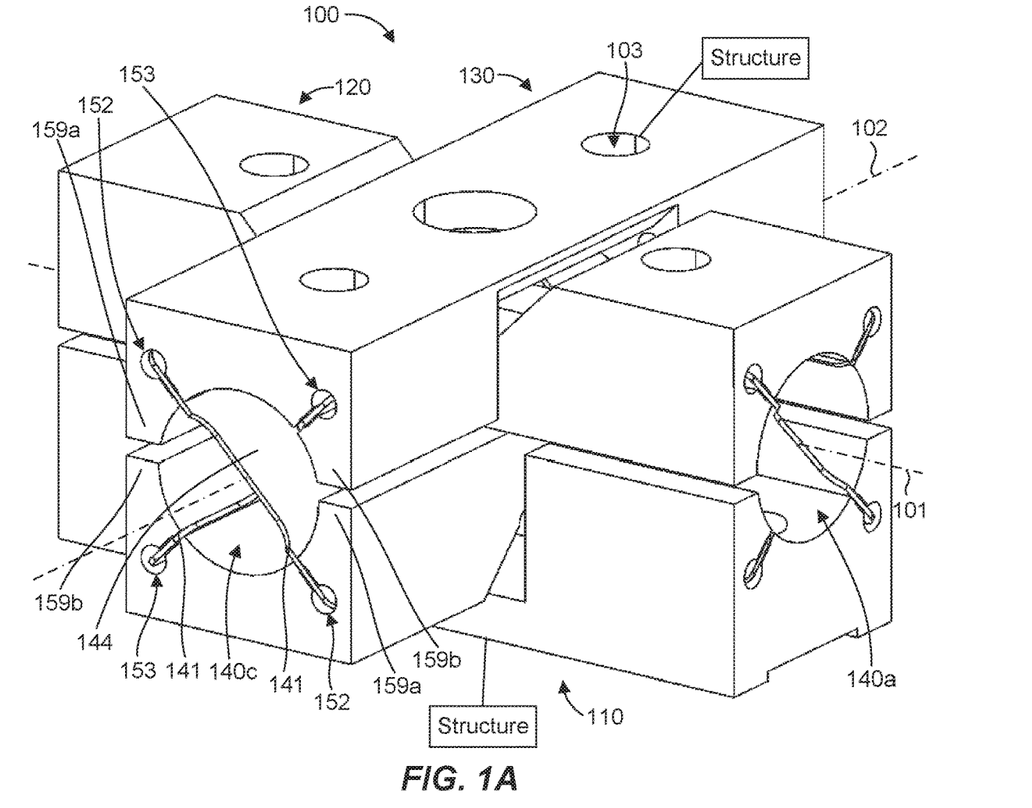
FIG. 1A is an illustration of a flexural pivot in accordance with an example of the present disclosure.
Figure 1B:
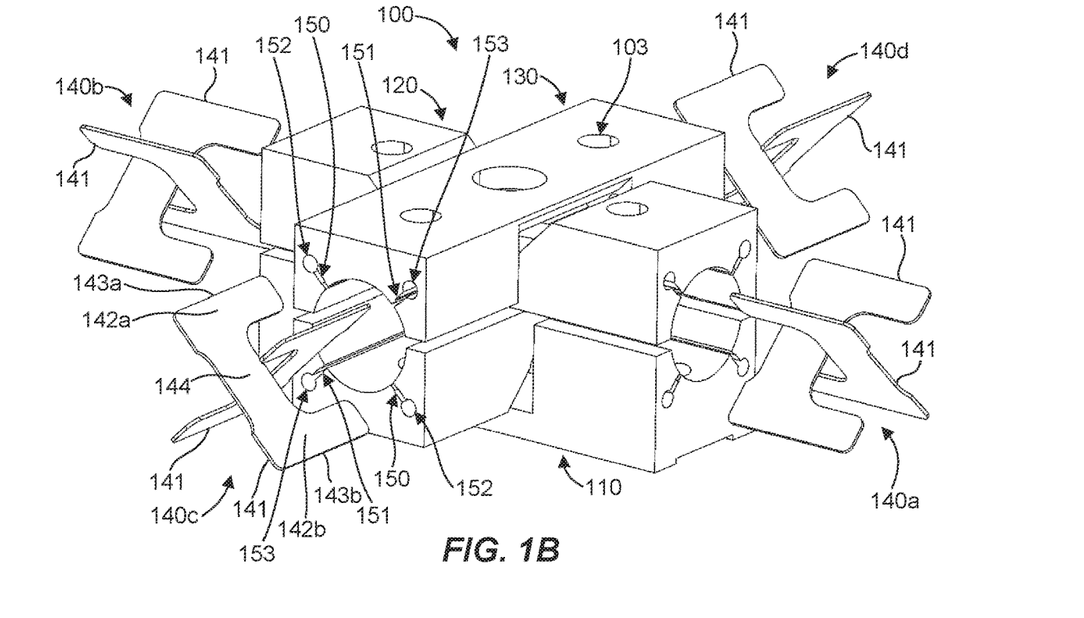
FIG. 1B is an exploded view of the flexural pivot of FIG. 1A.

One example of a flexural pivot 100 is illustrated in FIGS. 1A and 1B. The flexural pivot 100 can comprise flexure support members rotatably coupled to one another. For example, the flexural pivot 100 can include a first flexure support member 110, a second flexure support member 120 rotatably coupled to the first flexure support member 110 for relative rotation about a first axis 101, and a third flexure support member 130 rotatably coupled to the second flexure support member 120 for relative rotation about a second axis 102. The axes 101, 102 can be orthogonal. Although three flexure support members 110, 120, 130 are illustrated, it should be recognized that a flexural pivot 100 can include only two flexure support members coupled to one another for relative rotation about only a single axis.

The flexural pivot 100 can be coupled to external structures to facilitate relative rotation of the structures about the first and second axes 101, 102. For example, the flexural pivot 100 can be coupled to and utilized with fast steering mirrors, which are commonly used in electro-optical sensors, directed energy systems, long range laser communications systems, telescopes, or other precision optics applications, and therefore may be included in laboratory-based systems, airborne line of sight stabilization systems, satellites, cameras, etc. Thus, one structure can be an optical bench of an electro-optical sensor, and the other structure can be a mirror. The external structures can be coupled to the first and third flexure support members 110, 130 utilizing coupling interfaces such as openings or holes 103 (which can be threaded), slots, pins, studs, and other coupling interfaces.

The flexural pivot 100 can include flexures 140a-d (i.e., cross blade flexures) rotatably coupling the first, second and third flexure support members 110, 120, 130 to one another. For example, the flexures 140a-b can rotatably couple the first and second flexure support members 110, 120 to one another, and the flexures 140c-d can rotatably couple the second and third flexure support members 120, 130 to one another. Thus, the first and second flexure support members 110, 120 can move relative to one another about the first axis 101, and the second and third flexure support members 120, 130 can move relative to one another about the second axis 102, which can provide relative rotation of the first and third flexure support members 110, 130 about two axes or in two degrees of freedom. Two or more flexures can be utilized for a given axis to provide stability for the flexure support members. The second flexure support member 120 moves in only a single degree of freedom with respect to each of the first and third flexure support members 110, 130. The second flexure support member 120 may be referred to as a coupler due to its intermediate relationship with respect to the first and third flexure support members 110, 130 and function coupling the two-axis rotational movement of the flexural pivot 100. In one aspect, the flexural pivot 100 can provide a frictionless pivot coupling between two bodies (i.e., external structures) that can support significant loads during high accelerations and allow large angular travel. In addition, the flexural pivot 100 can be designed such that the masses of all the moving parts are balanced at the same center of gravity. For example, the second flexure support member 120 or coupler can be configured so its center of gravity is at the intersection of both the first and second pivot axes 101, 102, which allows its weight to not affect the balancing of the supported or moving mass in both axes.

Figure 2:
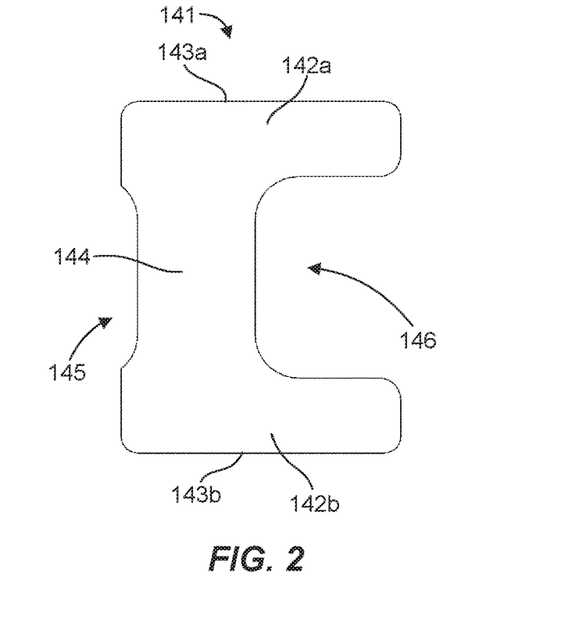
FIG. 2 illustrates a flexible blade unit of the flexural pivot of FIGS. 1A and 1B.

Each flexure 140a-d can have two or more flexible blades 141 arranged in a cross configuration. For example, the flexible blades 141 can have a C-shape or configuration. The flexible blades 141 can be oriented with the open sides of the C-shapes facing and oriented about 90 degrees relative to one another to achieve the cross blade configuration. A flexible blade 141 is shown isolated in FIG. 2. The flexible blades 141 can have any suitable dimension, as the principles disclosed herein provide flexural pivot components that are scalable to accommodate a wide range of sizes and applications. In one example, a flexural pivot 100 can have an overall size dimension (e.g., length and/or width) of 1.86 inches, and the flexible blades 141 can have a thickness of 0.012 inches. The flexible blades 141 can be made of any suitable material. In some examples, the flexible blade 141 can be made of materials having relatively high yield and fatigue strength, such as steel (e.g., high-carbon spring stainless steel), or titanium (e.g., 6Al-4V).

Figure 3:
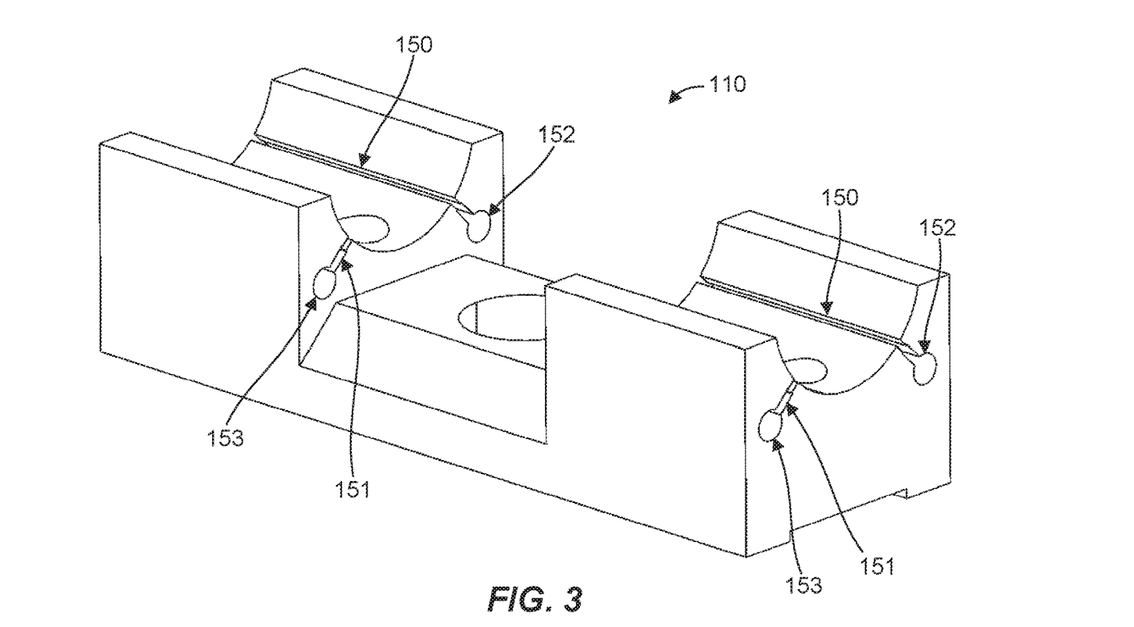
FIG. 3 illustrates a first flexure support member of the flexural pivot of FIGS. 1A and 1B.
Figure 4:
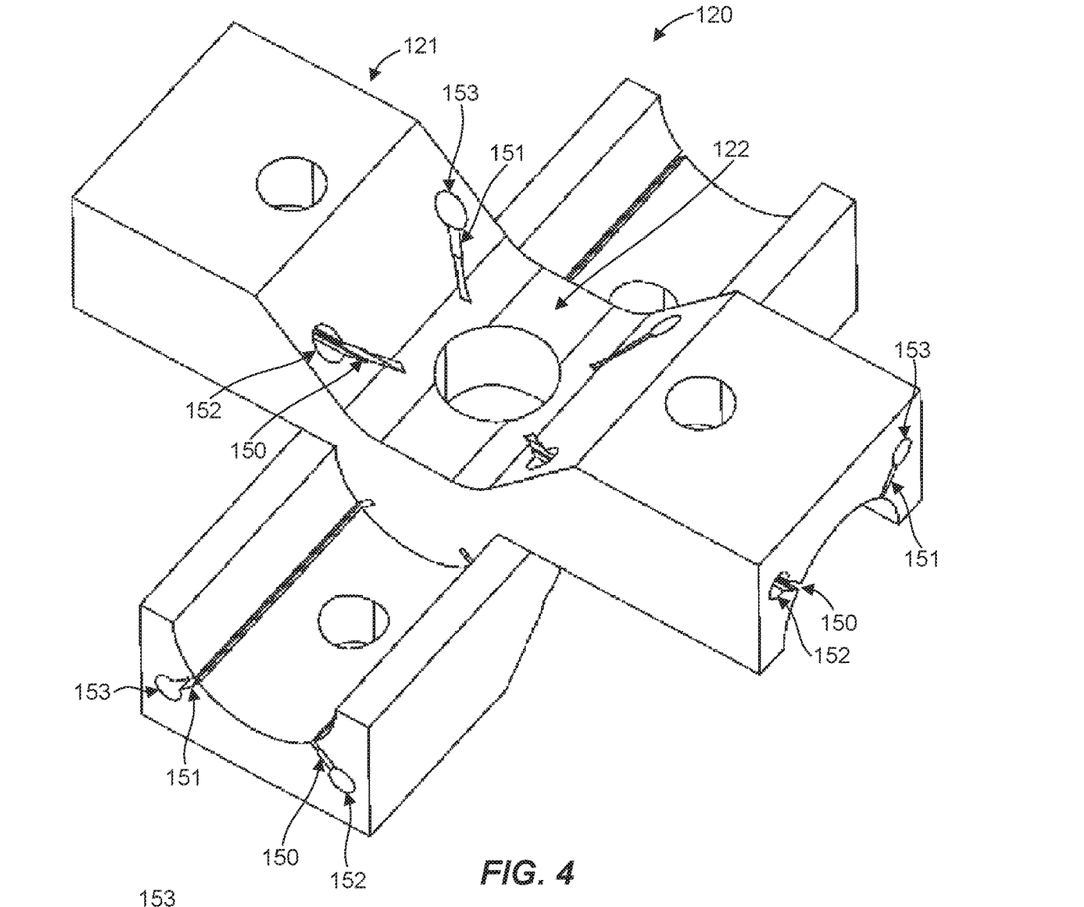
FIG. 4 illustrates a second flexure support member of the flexural pivot of FIGS. 1A and 1B.
Figure 5:
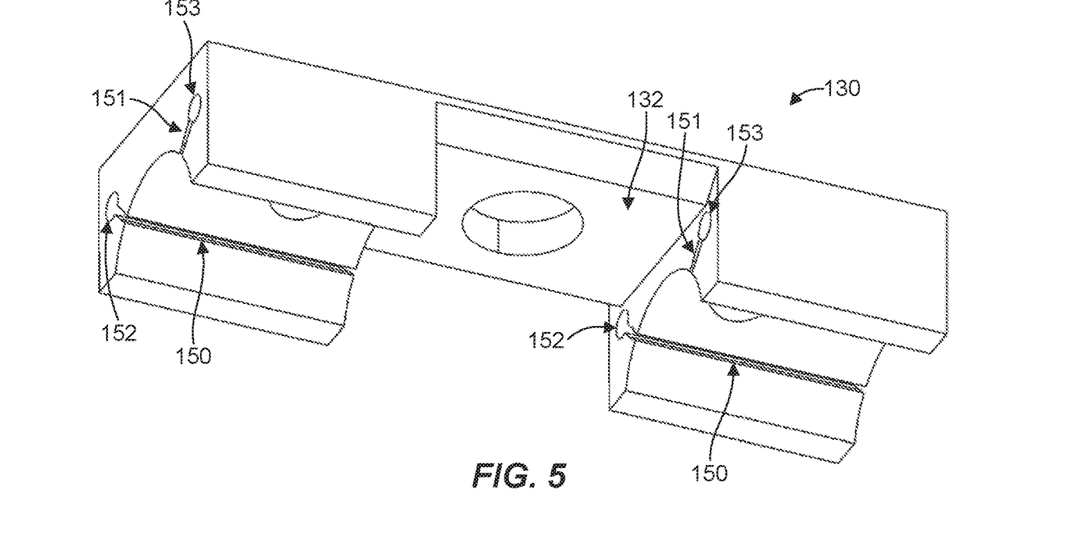
FIG. 5 illustrates a third flexure support member of the flexural pivot of FIGS. 1A and 1B.

Each of the first, second and third flexure support members 110, 120, 130 can have flexure openings 150, 151, which can be configured as slots to receive the flexible blades 141. The flexure openings 150, 151 can extend into ends of the first, second and third flexure support members 110, 120, 130. In addition, each of the first, second and third flexure support members 110, 120, 130 can have wells 152, 153 (e.g., braze or adhesive wells) in fluid communication with the flexure openings 150, 151 to facilitate coupling the flexible members 141 to the flexure support members 110, 120, 130. Braze material or another type of coupling material (e.g., epoxy or other adhesive) (not shown) can be disposed in the wells 152, 153. A braze material can be heated and caused to flow from the wells 152, 153 into the flexure openings 150, 151 about the flexible members 141 to couple the flexible members 141 to the first, second and third flexure support members 110, 120, 130. For clarity, flexure openings 150, 151 and wells 152, 153 of the first, second and third flexure support members 110, 120, 130 are only identified on portions of the second and third flexure support members 120, 130 in FIGS. 1A and/or 1B. These features are shown in FIGS. 3-5 and identified with the same reference numbers associated with each individually illustrated flexure support member. Using an epoxy or other adhesive to couple the flexible members 141 to the first, second and third flexure support members 110, 120, 130, the adhesive can be selected as having a sufficient viscosity to facilitate wicking of the adhesive into the flexure openings 150, 151 via capillary action. Although it is contemplated that various coupling materials can be used, the following detailed description and the examples presented will be illustrated using a braze material as the example coupling material. However, this is not intended to be limiting in any way.

The wells 152, 153 can be located at ends of the flexure openings 150, 151 (e.g., radially outward relative to the flexure openings 150, 151). This can locate the wells 152, 153 proximate to or disposed about portions of the flexible blades 141 that are disposed in the flexure openings 150, 151 to facilitate coupling the flexible blades 141 to the first, second and third flexure support members 110, 120, 130. The flexible blades 141 can be disposed in the flexure openings 150, 151, which can be configured as slots, such that side walls of the flexure openings 150, 151 are disposed on opposite sides of coupling portions 142a, 142b of the flexible blades 141. For example, as shown in FIG. 1B, a flexible blade 141 can be disposed in the flexure opening 150 of the third flexure support member 130, such that side walls of the flexure opening 150 are disposed on opposite sides of a coupling portion 142a of the blade. In addition, the same flexible blade 141 can be disposed in the flexure opening 150 of the second flexure support member 120, such that side walls of the flexure opening 150 are disposed on opposite sides of a coupling portion 142b of the blade 141. Each of the flexible blades 141 can be similarly disposed in the other flexure openings 150, 151 of the flexure support members 110, 120, 130. In some embodiments, the flexible blades 141 can extend at least partially into the wells 152, 153.

The wells 152, 153 can have any suitable shape or configuration. For example, the wells 152, 153 can comprise cylindrical openings oriented to extend along the radially outward ends of the flexure openings 150, 151 or along ends 143a, 143b of the flexible blades 141. In addition, the flexure openings 150, 151 can be configured to facilitate a brazed coupling with the flexible blades 141 while maintaining braze material within the flexure openings 150, 151 away from the free length or bending portion 144 between the coupling portions 142a, 142b of the flexible blades 141. For example, the flexure openings 150, 151 can "neck down" or narrow away from the wells 152, 153. This geometry of the flexure openings 150, 151 combined with the presence of the flexible blade 141 can capture or limit the flow or capillary action of braze material away from the wells 152, 153. The side walls of the flexure openings 150, 151 can therefore be configured to maintain or confine the braze material in the flexure openings 150, 151 and prevent or limit braze material from contacting the bending portions 144 of the flexible blades 141. The side walls defining the flexure openings 150, 151 can be precisely formed to engage with the blades 141 and accommodate braze material and/or block braze material flow.

By brazing or capturing the coupling portions 142a, 142b of the flexible blade 141 within the flexure openings 150, 151 with braze material originating proximate the outside ends 143a, 143b or edges of the flexible blades 141, the bending portion 144 between the coupling portions 142a, 142b of the flexible blades 141 can be precisely controlled, which can provide repeatable and predictable performance of the flexural pivot 100. In addition, with the braze material being remotely located from the bending portions 144 (i.e., not located at junctions of the bending portions and the flexure support members), braze material is kept away from the bending portions 144 (which are subject to fatigue), and stress concentrations in the bending portions 144 can be reduced or minimized. Thus, angular travel can be increased for the same bending portion length without failure of the blades. In addition, because the bending portion 144 of the blade 141 does not terminate at the braze material, the braze material does not experience bending stress. The flexural performance of the blades 141 are therefore not limited by the braze couplings with the flexure support members 110, 120, 130. Although braze material is not illustrated in FIG. 1A for clarity in showing certain aspects of the present disclosure, the braze material can be located in the flexure openings 150, 151 between the flexible blades 141 and the side walls of the flexure openings 150, 151 in the flexure support members 110, 120, 130. As illustrated (i.e., without braze material), FIG. 1A shows a flexural pivot precursor in accordance with one example of the present disclosure.

In one aspect, the bending portions 144 of the flexible blades 141 can be prevented from contacting adjacent components (e.g., another flexible blade 141 and/or a flexure support member 110, 120, 130 to which the flexible blade 141 is coupled) to facilitate smooth, unrestricted movement of the flexible blades 141 during operation. For example, the bending portions 144 of the flexible blades 141 can be recessed 145, 146 on outer sides of the flexible blades 141 to prevent the bending portions 144 from contacting adjacent components. In other words, an outer edge or surface of the bending portion 141 may not be coplanar or flush with the outer edge or surfaces of the coupling portions 142a, 142b. In addition, the flexible blades 141 can have a C-shape or configuration to facilitate arranging two flexible blades 141 in a cross configuration while providing bending portions 144 that are offset from one another. For example, the recess 146 can be much larger than the recess 145, thus effectively positioning the bending portion 144 laterally offset with respect to the coupling portions 142a, 142b. This configuration can maximize the lateral size of the coupling portions 142a, 142b to improve coupling integrity with the flexure support members 110, 120, 130. As shown in FIGS. 1A and 1B, the flexible blades 141 can be substantially identical.

In one aspect, the first, second and third flexure support members 110, 120, 130 can include travel stops 159a, 159b to mechanically limit a rotational range of motion of the flexible blades 141. The opposing travel stops 159a, 159b of the flexure support members can be configured to contact one another at the rotational travel limits. The travel stops 159a, 159b can limit the range of motion to any suitable degree. Typically, the travel stops 159a, 159b will be configured to prevent excessive bending of the flexible blades 141 that may result in failure (e.g., yielding) of the blades. The travel stops 159a, 159b can have any suitable configuration or interface surface to contact opposing travel stops. The travel stops 159a, 159b can be defined at least partially by the outer side surfaces 155, 156 of the flexure support members 110, 120, 130.

Figure 6A:
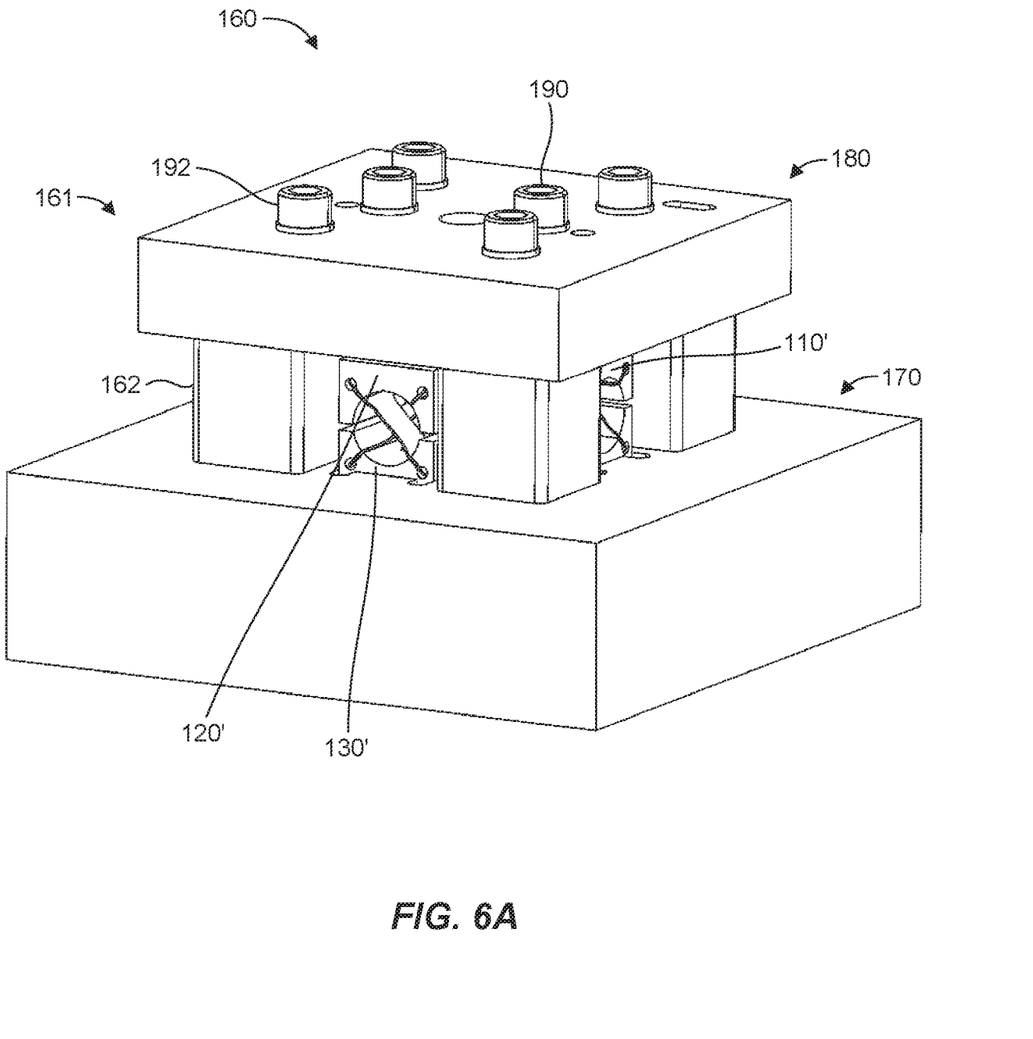
FIG. 6A is an illustration of a flexural pivot manufacturing system in accordance with an example of the present disclosure.
Figure 6B:
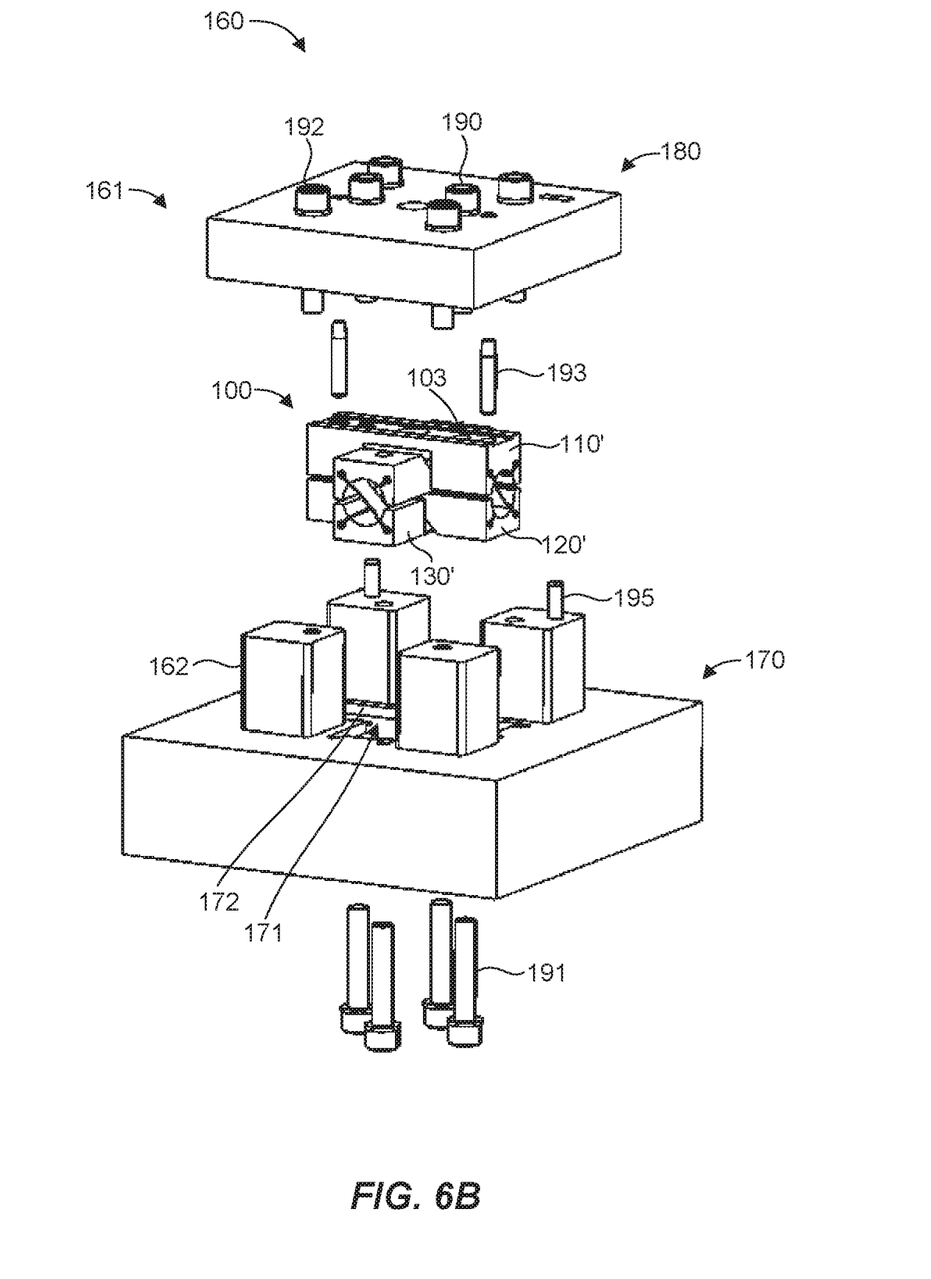
FIG. 6B is an exploded view of the flexural pivot manufacturing system of FIG. 6A.

FIGS. 6A and 6B illustrate a flexural pivot manufacturing system 160 in accordance with an example of the present disclosure. The manufacturing system 160 can include a fixture 161 having a bottom support 170 and a top support 180. The top and bottom supports 180, 170 can be configured to facilitate manufacturing and assembly of a flexural pivot, such as the flexural pivot 100 described above. Thus, the manufacturing system 160 can include flexural pivot support member workpieces 110', 120', 130' coupled to the fixture 161. A complete flexural pivot 100 (excluding braze material) is shown in FIGS. 6A and 6B to demonstrate how the fixture 161 can be used to facilitate certain manufacturing and assembly steps in a method for making a flexural pivot 100. Thus, it should be recognized that flexural pivot support member workpieces 110', 120', 130' can be at any suitable stage of manufacture when the fixture 161 is utilized. The first, second and third flexure support members 110, 120, 130 can be made of any suitable material, such as titanium or steel.

The workpieces 110', 120', 130' for manufacturing the three flexure support members 110, 120, 130 can be coupled to and supported by the fixture 161. For example, the flexural pivot support member workpiece 110' that will form the first flexure support member 110 can be supported by and coupled to the top support 180. The flexural pivot support member workpiece 130' that will form the third flexure support member 130 can be supported by and coupled to the bottom support 170. The flexural pivot support member workpiece 120' that will form the second flexural pivot flexure support member 120 can be disposed between the other flexural pivot support member workpieces 110', 130'. The workpiece 120' can be supported by and coupled to the top support 180 and/or the bottom support 170. In the illustrated example, the flexural pivot support member workpiece 120' that will form the second flexural pivot flexure support member 120 is coupled to the bottom support 170. The flexural pivot support member workpieces 110', 120', 130' can be coupled to the bottom and top supports 170, 180 by fasteners 190, 191 and/or pins 193, which can utilize any suitable coupling interface, such as the holes or openings 103 and/or slots. In addition, the bottom and top supports 170, 180 can be coupled to one another, such as by fasteners 192 and/or pins 195. The pins 193, 195 can be used to precisely position the top support 180, the bottom support 170, and/or the various flexural pivot support member workpieces 110', 120', 130' relative to one another. Pivot flexure interface surfaces of the fixture 161, such as the interface surface 171 of the bottom support 170, can be configured to interface with outer (e.g., top and bottom) surfaces of the flexural pivot 100 to mount and support the workpieces 110', 120', 130' during manufacture and assembly. In one aspect, the interface surface 171 can be recessed and sidewalls 172 of the recess can serve as locating or positioning features for the flexure support member workpieces 110', 120', 130'.

The fixture 161 can include standoff spacers 162 located in the corners of the flexural pivot support member workpieces 110', 120', 130' (i.e., adjacent to sides of the workpieces 110', 120', 130' to position the top and bottom supports 180, 170 relative to one another and thereby position the flexural pivot support member workpieces 110', 120', 130' relative to one another. In other words, the standoff spacers 162 can form four legs located in four concave corners of the flexural pivot support member workpieces 110', 120', 130'. The standoff spacers 162 can be associated with the top support 180 and/or the bottom support 170. In the illustrated embodiment, the standoff spaces 162 are associated with the bottom support 170. The top and bottom supports 180, 170 of the fixture 161 can have a plate or block configuration and the standoff spacers 162 can be disposed between the plates or blocks. This fixture configuration of top and bottom supports and standoff spacers 162 can expose the ends of the flexural pivot support member workpieces 110', 120', 130', which can facilitate formation of the flexure openings 150, 151 and wells 152, 153, which is described below.

The top and bottom supports 180, 170 of the fixture 161 can be configured to facilitate formation of the flexure openings 150, 151, described above with respect to FIGS. 1A-5, to form the first, second and third flexure support members 110, 120, 130. The flexure openings 150, 151 can be formed in the workpieces 110', 120', 130' in any suitable manner utilizing any suitable process or combination of processes. For example, the flexure openings 150, 151 may be formed in the workpieces 110', 120', 130' by a material removal process, such as machining. Example machining processes include electrical discharge machining (EDM), water jet cutting, milling, etc. A manufacturing process may be selected based on the design objectives, tolerance requirements, cost, etc. A wire EDM process may provide precise machining that can meet tight tolerances and accurately control the flexure openings 150, 151. In one aspect, utilizing a common fixture 161 to support the first, second and third flexure support member workpieces 110', 120', 130' can establish and maintain precision mounting relationships during machining or material removal operations that form the flexure openings 150, 151. Thus, flexure openings 150, 151 can be formed in the same fixture setup and at the same time to ensure proper alignment of the flexure openings 150, 151 for the flexible blade 141. This can minimize stresses induced in the blades 141 during assembly due to misalignment, which can provide predictable performance of the flexural pivot 100. The cuts can be generally in radial directions or, in other words, radially inward and outward relative to the axes of rotation 101, 102. The flexure openings 150, 151 and the wells 152, 153 can be formed with the same material removal operation.

In one aspect, the flexure support members 110, 120, 130 and the fixture 161 can be designed to allow the assembly-level formation of the flexure openings 150, 151 to ensure alignment of the flexure openings 150, 151 for assembly with the flexible blades 141. For example, with the first, second and third flexure support members 110, 120, 130 in the "assembled" relationship shown in FIG. 1B, projected profiles of the flexure openings 150, 151 and/or the wells 152, 153 can extend uninterrupted by adjacent flexure support members in directions parallel to an axis of rotation 101, 102 associated with a given flexure 140a-d. In other words, the geometry of the first, second and third flexure support members 110, 120, 130 can be such that a line of sight along the flexure openings 150, 151 and/or the wells 152, 153 fora given flexure support member is not blocked by an adjacent or neighboring flexure support member. This attribute can facilitate manufacture of the flexure support members 110, 120, 130 coupled together in a common jig or fixture 161, such as by wire EDM.

As an example, the flexure openings 150 in the flexure support member 120, shown in FIGS. 1B and 4, can be made simultaneously with the same manufacturing processes, such as wire EDM. For example, holes in a top cross portion 121 of the flexure support member 120 can be formed (e.g., by drilling) as a starting location for a wire EDM process. The holes can be located across a gap or recess 122 from one another. The same drilling operation can form both holes. The holes can form the wells 152 or the wells can be finish machined by a wire EDM process. The wire for the EDM process can extend through both holes to machine both flexure openings 150 in the top cross portion 121 with the same wire EDM process at the same time. Because the flexure support member 130 is disposed in the assembled position during the machining processes, the flexure support member 130 can include a gap or recess 132 (FIG. 5) that is configured to provide clearance for the drill, wire, etc. used to form the wells 152 and the flexure openings 150 in the top cross portion 121 of the second flexure support member 120. This sort of clearance relationship between adjacent flexure support members and part features to be machined (e.g., flexure openings and wells) can be replicated throughout the pivot flexure to facilitate simultaneous fixturing and machining of such features in all three of the first, second and third flexure support members 110, 120, 130.

Cutting or forming the flexure openings 150, 151 in the same fixture setup can provide good alignment of the flexure openings. This can reduce or minimize displacement driven stresses in the blades due to misalignment of the flexure openings 150, 151. Once the flexure openings 150, 151 have been formed, the flexure support members 110, 120, 130 can be removed from the fixture 161 and cleaned prior to final assembly where the flexure support members are again secured in the fixture 161 and receive the flexible blades 141 in the flexure openings 150, 151, as described above with respect to FIGS. 1A-5.

The flexible blades can be manufactured utilizing any suitable process or technique, such as milling, EDM, water jet machining, casting, forging, stamping, photochemical machining (PCM), laser cutting, etc. A wire EDM, PCM, and/or laser cutting process may be utilized to provide accurate control of the part geometry. Final surfaces may be achieved by grinding, honing, polishing, etc. to a desired geometric and/or dimensional tolerance, and/or surface finish.

The top and bottom supports 180, 170 can be configured to facilitate disposing the flexible blades 141 in the flexure openings 150, 151 to rotatably couple the first, second and third flexure support members 110, 120, 130 to one another. For example, the top and bottom supports (including standoff spacers 162) can provide access to ends of the first, second and third flexure support members 110, 120, 130 to facilitate disposing the flexible blades 141 in the flexure openings 150, 151 of the first, second and third flexure support members 110, 120, 130. By providing sufficient space about the ends of the flexure support members 110, 120, 130, the flexible blades 141 can be inserted into the flexure openings 150, 151. In addition, supporting the first, second and third flexure support members 110, 120, 130 in the fixture 161 can align the flexure openings 150, 151 to facilitate stress-free assembly of the blades 141 prior to brazing.

With the flexure support members 110, 120, 130 fixtured or fixed and the flexible blades 141 disposed in the flexure openings 150, 151 as illustrated in FIGS. 1A and 1B, braze material can be disposed in the wells 152, 153 to couple the flexible blades 141 to the flexure support members. This configuration can represent a flexural pivot precursor in accordance with one example of the present disclosure. As described herein, the top and bottom supports 180, 170 can be configured to facilitate coupling the flexible blades 141 to the flexure support members 110, 120, 130, such as by providing access to the ends of the flexure support members for putting braze material in the wells 152, 153. Any suitable type of braze material in any suitable configuration may be utilized. For example, braze material in wire form can be disposed in the wells 152, 153. Alternatively, braze material in foil form can be disposed about the ends of the flexible blades 141. In this case, the braze material can be initially located in the wells 152, 153 and/or in the flexure openings 150, 151.

With braze material disposed in the wells 152, 153, the braze material can be heated sufficiently to cause the braze material to flow (e.g., via capillary action) into the flexure openings 150, 151 about the flexible blades 141 to couple the flexible blades to the flexure support members 110, 120, 130. The braze material can be heated in any suitable manner, such as by disposing the manufacturing system 160 in a furnace. Thus, the same fixture 161 can be used to support the parts through a brazing operation. Brazing the flexible blades 141 to the flexure support members 110, 120, 130 in the same fixture 161 can ensure proper alignment of the blades 141 as they are brazed. The flexible blades 141 can therefore be brazed in a single brazing operation with no post-machining necessary. The principles disclosed herein can provide superior brazed connections than that available in COTS flexural pivots.

As indicated above, although brazing has been discussed herein as the exemplary way to couple the flexible blades to the flexure support members, such is not intended to be limiting in any way. For example, it is contemplated that the flexible blades can be coupled to the flexure support members using an epoxy or other adhesive, which can be injected into the wells. The epoxy or other adhesive can comprise a viscosity sufficient to cause the epoxy or other adhesive to wick into the flexure openings via capillary action. Those skilled in the art will recognize still other ways that the flexible blades can be coupled to the flexure support members.

It is noted that no specific order is required in the methods disclosed herein, though generally in some embodiments, method steps can be carried out sequentially.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A flexural pivot, comprising:
   three flexure support members, each flexure support member having a plurality of flexure openings, and a plurality of wells, each well in fluid communication with a respective one of the plurality of flexure openings; and a plurality of flexures rotatably coupling the three flexure support members to one another, respectively, the plurality of flexures each having first and second flexible blades arranged in a cross configuration, wherein the first and second flexible blades of the plurality of flexures are disposed in a respective one of the plurality of flexure openings and extend into respective wells of the flexure support members, the wells comprising arcuate openings oriented to extend along respective ends of the flexible blades, such that at least a portion of opposing surfaces of the first and second flexible blades of the plurality of flexures within the wells, and a surface of the wells define a volume of space on each side of the opposing surfaces of the first and second flexible blades, the volumes of space being in fluid communication with the flexure openings, respectively, and wherein a flowable coupling material deposited in the volumes of space is deposited on the exposed portion of the opposing surfaces of the first and second flexible blades within the wells, and extends into the flexure openings to join the first and second flexible blades to the flexure support members at outer ends of the flexure openings.

2. The flexural pivot of claim 1, wherein the flexure openings are configured as slots.

3. The flexural pivot of claim 1, wherein two flexure support members are configured to be rotatably coupled to one another via two flexures.

4. The flexural pivot of claim 1, wherein a first flexure support member and a second flexure support member are configured to be rotatable relative to one another about a first axis, and the second flexure support member and a third flexure support member are configured to be rotatable relative to one another about a second axis.

5. The flexural pivot of claim 4, wherein the first and second axes are perpendicular to one another.

6. The flexural pivot of claim 4, wherein the first flexure support member and the second flexure support member are configured to be rotatably coupled to one another via two flexures, and the second flexure support member and the third flexure support member are configured to be rotatably coupled to one another via two flexures.

7. The flexural pivot of claim 1, wherein the flexure support members comprise travel stops to limit a range of rotational movement.

8. The flexural pivot of claim 1, wherein the flowable coupling material is a braze material.

9. The flexural pivot of claim 1, wherein the flowable coupling material is an adhesive.

10. The flexural pivot of claim 1, wherein the openings of the wells comprise arcuate openings.

11. A flexural pivot precursor, comprising:

three flexure support members, each flexure support member having a plurality of flexure openings and a plurality of wells each well in fluid communication with a respective one of the plurality of flexure openings; and a plurality of flexures rotatably coupling the three flexure support members to one another, respectively, the plurality of flexures each having first and second flexible blades arranged in a cross configuration, wherein the first and second flexible blades of the plurality of flexures are disposed in a respective one of the plurality of flexure openings and extend into respective wells of the flexure support members, the wells comprising arcuate openings oriented to extend along respective ends of the flexible blades, such that at least a portion of opposing surfaces of the first and second flexible blades of the plurality of flexures within the wells, and a surface of the wells define a volume of space on each side of the opposing surfaces of the first and second flexible blades, the volumes of space being in fluid communication with the flexure openings, respectively, and wherein the flexure openings are configured to facilitate joining of respective ones of the first and second flexible blades to respective ones of the flexure support members at outer ends of respective flexure openings via a flowable coupling material disposed in the volume of spaces that extends into the flexure openings.

12. The flexural pivot precursor of claim 11, wherein the flowable coupling material comprises a braze material disposed in the wells to couple the first and second flexible blades to the flexure support members.

13. The flexural pivot precursor of claim 11, wherein the flowable coupling material comprises an adhesive material disposed in the wells to couple the first and second flexible blades to the flexure support members.

\* \* \* \* \*